United States Patent [19]

Bossi et al.

[11] Patent Number: 5,664,008

[45] Date of Patent: Sep. 2, 1997

[54] MESSAGE WAITING ADJUNCT DEVICE

[75] Inventors: Burt Joseph Bossi, Indianapolis; William Alan Hewitt, Greenfield; Stephen Dale Hoskins, Indianapolis, all of Ind.

[73] Assignee: AT&T, Middletown, N.J.

[21] Appl. No.: 570,145

[22] Filed: Dec. 11, 1995

[51] Int. Cl.⁶ .................................................. H04M 1/64
[52] U.S. Cl. .............................. 379/67; 379/372; 379/376; 379/396
[58] Field of Search .............................. 379/67, 88, 89, 379/372, 376, 396, 442, 214

[56] References Cited

U.S. PATENT DOCUMENTS

| | | | |
|---|---|---|---|
| 5,243,642 | 9/1993 | Wise, Jr. et al. | 379/82 |
| 5,384,832 | 1/1995 | Zimmerman et al. | 379/89 |
| 5,432,844 | 7/1995 | Core et al. | 379/67 |
| 5,461,667 | 10/1995 | Remillard | 379/96 |

OTHER PUBLICATIONS

Romar, LTD. VM-1000 Voice Message Waiting Indicating Brochure Jun. 22, 1990.

*Primary Examiner*—Fan Tsang
*Attorney, Agent, or Firm*—Jean-Robert Mirville

[57] ABSTRACT

A telephone adjunct interface for use with a network-based voice and/or data message storage and delivery service detects and alerts the subscriber to the existence of waiting messages. The interface device utilizes a combination of AC ring detection and outcall polling of the network to determine whether a visual and/or audible notification should be provided to the subscriber. That is, if the subscriber phone is not answered after a selected number of rings, the interface polls the network after a suitable delay to determine if any messages were left. If the subscriber line is busy or on call-forward while a calling party is seeking to leave a message, the network service platform stores the message and waits a selected interval before seeking to alert the subscriber. Advantageously, the device is configured as a small, portable and inexpensive consumer premise unit which connects easily to all standard analog telephone systems that use modular connectors.

12 Claims, 4 Drawing Sheets

FIG. 5 ns service
MESSAGE WAITING ADJUNCT DEVICE

REFERENCE TO RELATED APPLICATIONS

This application is related to U.S. patent application Ser. No. 08/570,146 filed concurrently herewith (B. J. Bossi 3-2-2) and entitled METHOD OF PROVIDING TELECOMMUNICATIONS NETWORK-BASED MESSAGING SERVICES.

1. Technical Field

The present invention relates generally to telecommunications and, more particularly, to a customer premise device which performs message indication in connection with network-based answering services.

2. Background of the Invention

Virtually all telecommunications services, in the United States, at least, can be obtained from a range of telecommunications providers. This includes both services provided to consumers, such as basic long-distance service, and business oriented services, such as sophisticated outbound calling programs. While there are, at present, a number of telecommunication services which are only available from the local exchange carrier, the number of such services is expected to shrink as other telecommunication service providers find ways to introduce similar services. One service which is presently offered as a central office function is telephone answering, an on-hook capability that allows a calling party who encounters a no-answer situation to record or leave a message for the called party in response to a pre-recorded voice prompt. When such an answering service is provided through the central office, the called party may ascertain that a call was received by picking up the receiver to create an off-hook condition whereupon the central office provides an interrupted or stutter dial tone to indicate that a call was received and that any message may be retrieved.

ROMAR Ltd. of Colorado Springs, Colo., has advertised a voice message waiting indicator that is a customer premise based product that automatically detects the presence of stutter dial tone on a central office, Centrex, or PBX line and activates a message-waiting light. The ROMAR device is designed to be connected between the telephone set and a modular RJ11 jack and is said to begin an automatic detection process after an unanswered incoming call, after any off-hook resulting from an incoming or outgoing call, or periodically to detect system messages left when no call was placed to the user's telephone.

Disadvantageously, telecommunications service providers, other than the local exchange carrier, seeking to offer a network based telephone answering service have been without a sufficiently reliable way of alerting the called party to the existing of waiting messages. In U.S. Pat. No. 5,243,642 issued to Wise et al. and entitled TELEPHONE CALL MANAGEMENT DEVICE, for example, there is disclosed a telephone adjunct device which utilizes a ring detector circuit to energize a message waiting light whenever an incoming call is received. This light is illuminated regardless of whether or not the call is answered and is de-energized manually by depressing a reset button. Unless the user subscribes to the service provided by the local carrier, in which a stuttered dial tone provides an immediate indication of the message waiting status as discussed above, the user must access the network message storage system before he or she can learn whether any messages were actually left. Since many callers will often choose not to leave a message, a substantial number of false message waiting indications is inevitable. As such, the system disclosed by Wise et al. is not sufficiently reliable for use in conjunction with the network service platforms utilized by telecommunications providers other than the local exchange carrier.

There is, therefore, a need for a reliable and economically feasible system for alerting a called party subscriber to a network voice or data messaging service that a call was received and that a message may be retrieved.

SUMMARY OF THE INVENTION

In accordance with the present invention, a call management device detects an unanswered incoming call to a telecommunications service subscriber and, if appropriate, provides an indication that information intended for the subscriber has been received, stored, or otherwise processed by the network provider of the service. Advantageously, the device is configured as a small, portable and inexpensive customer premises unit which connects easily to standard analog telephone systems that use modular connectors. The device utilizes a unique combination of AC ring detection and outcall polling of the network to perform multiple monitoring functions such, for example, as whether a calling party has actually left a voice or data message for the called party subscriber.

According to the invention, incoming calls are initially detected by an AC ring detection circuit. If the call is not answered (i.e., the subscriber line remains on-hook), a telephone call is automatically placed by the device to a network mailbox or other designated location associated with the device owner/subscriber. During this outcalling or polling operation, which may be delayed by an interval sufficient to allow the calling party to record a message, the device verifies whether or not a voice or data message was actually delivered to the subscriber's mailbox. To implement the polling operation, the device illustratively includes a telephone line capture circuit and a signaling circuit such, for example, as a DTMF encoder/decoder circuit.

In accordance with an illustrative embodiment of the present invention, the network application is configured to recognize a subscriber identifying signal received during the polling operation such, for example, as the automatic telephone number identification (ANI) signal, and to ascertain whether any voice and/or data messages have been received for that subscriber. If so, a status update signal such, for example, as a DTMF tone sequence, is sent to the device which activates an alert such as a light or lamp, e.g. an LED and/or a liquid crystal display (LCD), which accommodates circuitry to provide the notification and/or signaling of the number of calls received. Alternatively, a similarly nonintrusive audible notification may be provided. Illustratively, the interface device may be configured to detect when the telephone goes off-hook and to either repetitively seize and release the line before the user uses the telephone keypad or to apply an additional audible signal such, for example, as a sequence of clearly recognizable tones that will not be recognized by the central office, to the line. Optionally, the status update signal may itself comprise a signal portion indicative of an instruction to audibly reproduce a stored announcement such, for example, as a "message waiting" announcement. Upon noting the illuminated lamp or other alerting indication, the user may access the network application in a conventional manner to retrieve stored messages.

The present invention provides a highly reliable alerting system which does not require the use of a stuttered dial tone or other CLASS service signal that is available only from the local exchange carrier. As such, the call management device of the present invention makes it possible for telecommunication services providers to implement Voice Messaging Services, Independent Answering Bureaus, as well as other data and voice message/call notification applications such, for example, as electronic mail (E-Mail), electronic data interexchange (EDI) and facsimile transmission (FAX).

Additional features and advantages of the present invention will become readily apparent to those skilled in the art from the following detailed description, wherein only an illustrative embodiment of the invention is shown and described. As will be realized, the invention is capable of other and different embodiments and its several details are capable of modifications in numerous respects, all without departing from the invention. Accordingly, the drawings and description are to be regarded as illustrative in nature, and not as restrictive.

DETAILED DESCRIPTION

Figure 1A:
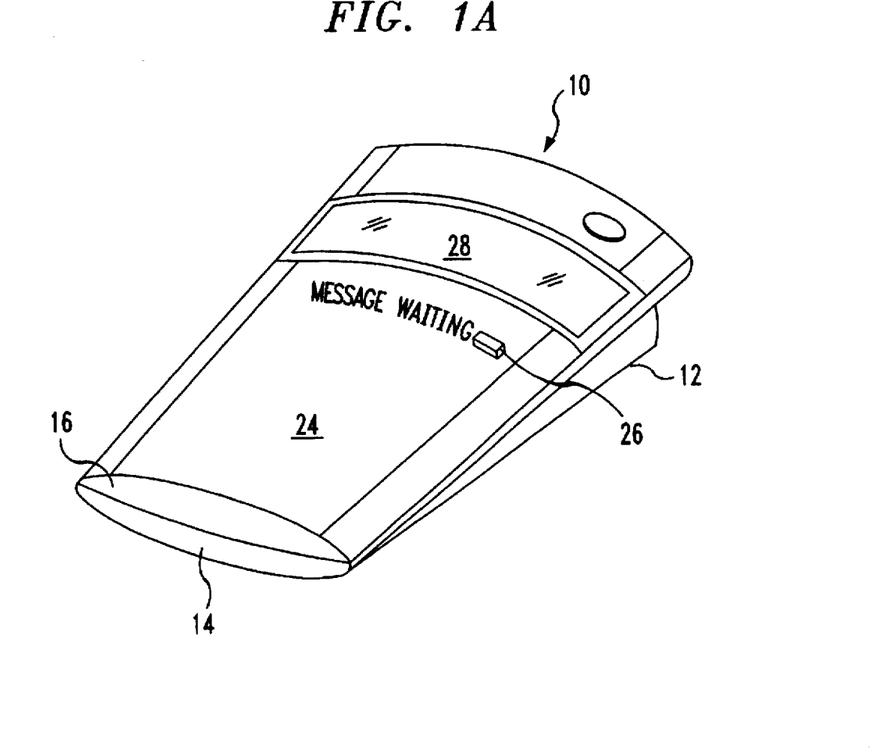
FIG. 1A is a perspective view of a telephone adjunct unit constructed in accordance with an illustrative embodiment of the present invention.
Figure 1B:
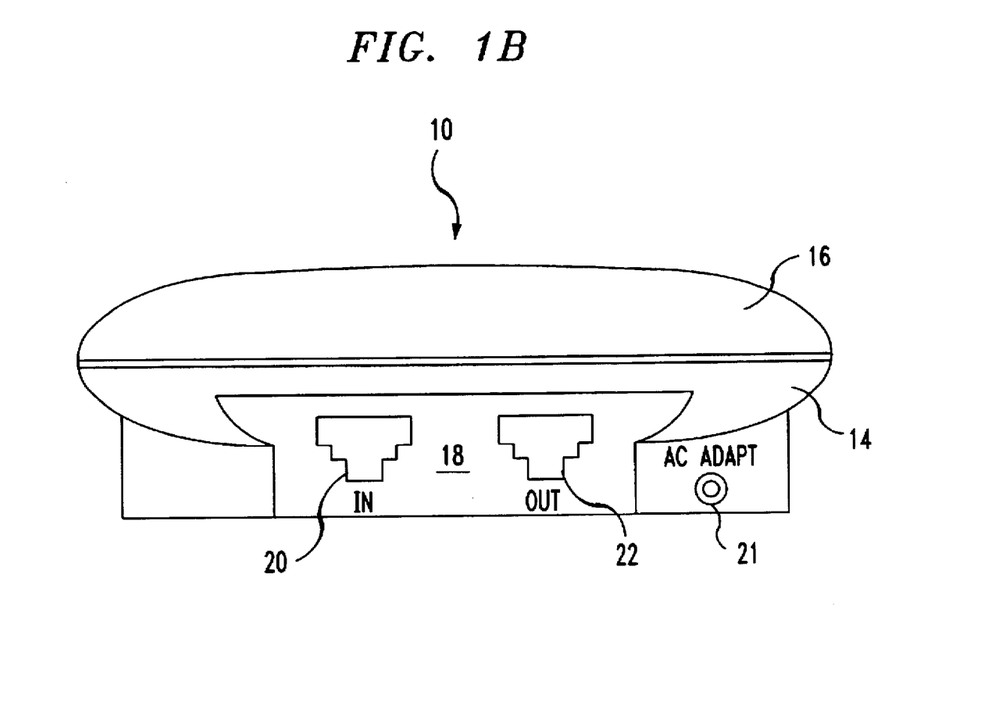
FIG. 1B is a vertical elevation of the rear side of the unit illustrated in FIG. 1A.
Figure 2:
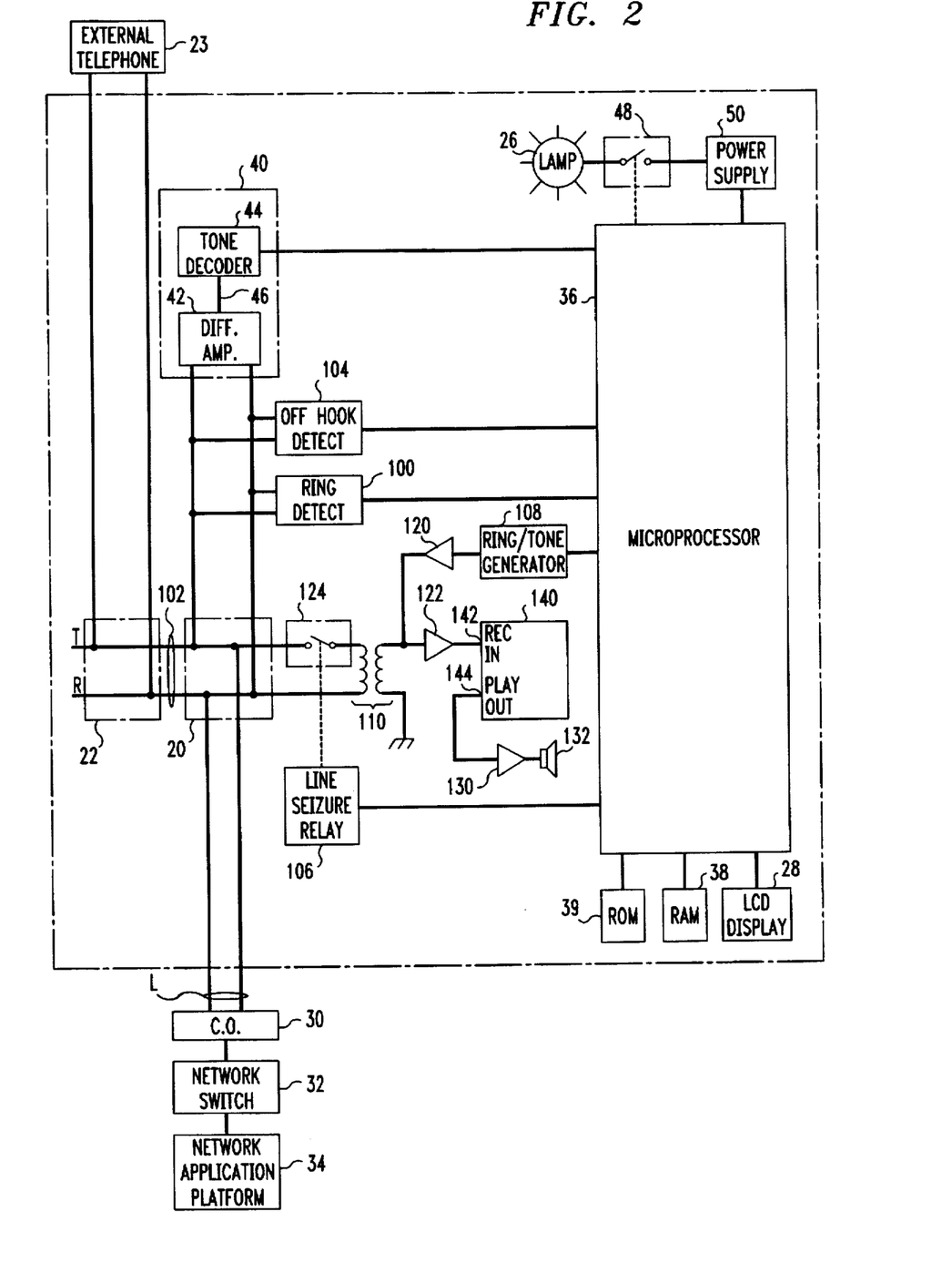
FIG. 2 is a functional block diagram of a telephone adjunct network interface unit coupled to a telecommunications provider's application platform in accordance with an illustrative embodiment of the present invention.

With initial reference to FIGS. 1A and 1B, there is shown an illustrative embodiment of a telephone adjunct network interface device 10 constructed in accordance with the present invention. The device 10 comprises a housing 12 which may be formed of a molded plastic base 14 and cover 16. The cover may be snap fitted or secured by adhesive to the base. The housing 12 is provided with a back or rear wall 18 which is best seen in FIG. 1B. A pair of RJ11 jacks 20 and 22 are mounted in the back wall to provide connection to a telephone line and telephone equipment such as telephone instrument 23 (FIG. 2). In many instances, the most convenient connection may be made by removing the RJ11 plug from the RJ11 jack on an existing customer premise telephone and inserting the plug into the "IN" RJ11 jack 20 in the device. As such, these connections are labeled "IN" and "OUT" in FIG. 1B. A second connector having RJ11 plugs at both ends is then connected between the "OUT" Pall 1 jack 22 and the RJ11 jack in the telephone. This arrangement permits connection without having to access the RJ11 jack connection to the premise telephone system which, in many instances, is inconvenient. It will, of course, be readily appreciated by those skilled in the art that the interface device of the present invention does not require an in-line connection to a telephone for its operation and, if desired, the "OUT" jack need not be utilized or even omitted altogether.

The cover 16 of the housing 12 in the illustrated embodiment includes a downwardly inclined operating surface 24 in which there is defined an indicating lamp 26 such, for example, as an LED. An LCD display 28 may also be provided to display, for example, a count of all messages currently awaiting delivery to the subscriber. The unit 10 is compact and may, for example, be 1 inch in height, 3.5 inches in length and 2 inches in width. The device is adapted for mounting on a tabletop or any other surface or may be wall mounted. The small size makes the device convenient to install and place in an almost unlimited selection of positions in either a residential or business environment.

Referring now to FIG. 2, there is shown a functional block diagram of a telephone adjunct network interface device 10 illustratively configured to interact with a telecommunication service provider's application platform. As seen in FIG. 2, the device 10 is coupled by line L to the central office (CO) 30 of the local telephone company serving the subscriber and, thereafter, to a network switch 32 such, for example, as a 4ESS or 5ESS switch manufactured by AT&T Corp.

The network services platform 34, which illustratively comprises a processor and message storage database (neither of which is shown), is connected to network switch 32, and is configured to provide voice and/or data message storage and retrieval services in a manner to be described later. At this point, it will merely be noted that device 10 may be configured to interact with a variety of network-based service application platforms in which a subscriber must be alerted to the existence of stored voice and/or data messages. These application platforms are expected to range, for example, from simple voice messaging services, to the storage and retrieval of data such as electronic mail (E-Mail), electronic data interexchange (EDI), and facsimile transmission (FAX).

In any event, and with continued reference to FIG. 2, it will be seen that device 10 includes a microprocessor 36 having associated therewith a memory (either ROM, RAM, EEPROM, or a combination thereof) to store instructions and other information. For purposes of illustrative example only, the device 10 is shown as being configured with both RAM 38 and ROM 39. It will, of course, be readily ascertained by those skilled in the art that such memory devices may be provided either internal to microprocessor 36 or externally as shown.

In the illustrative embodiment of FIG. 2, device 10 is configured for use with conventional tip and ring lines. Since a principal function of interface device 10 is to receive message waiting or other service status updates from services platform 34 and to thereafter provide a visual and/or audible indication of such status to the subscriber, interface device 10 is provided with a status signal decoding circuit 40 in order that microprocessor 36 may recognize the signal and act accordingly, as by energizing indicator lamp 26 (or de-energizing it, as the case may be). In order to maintain fight controls on remote activities that might affect the reliable operation of interface device 10, as by unauthorized persons who might seek to manipulate the interface devices of certain subscribers, status signal decoding circuit 40 is advantageously configured to detect a preselected signal which is not available to an ordinary telephone user.

Figure 3:
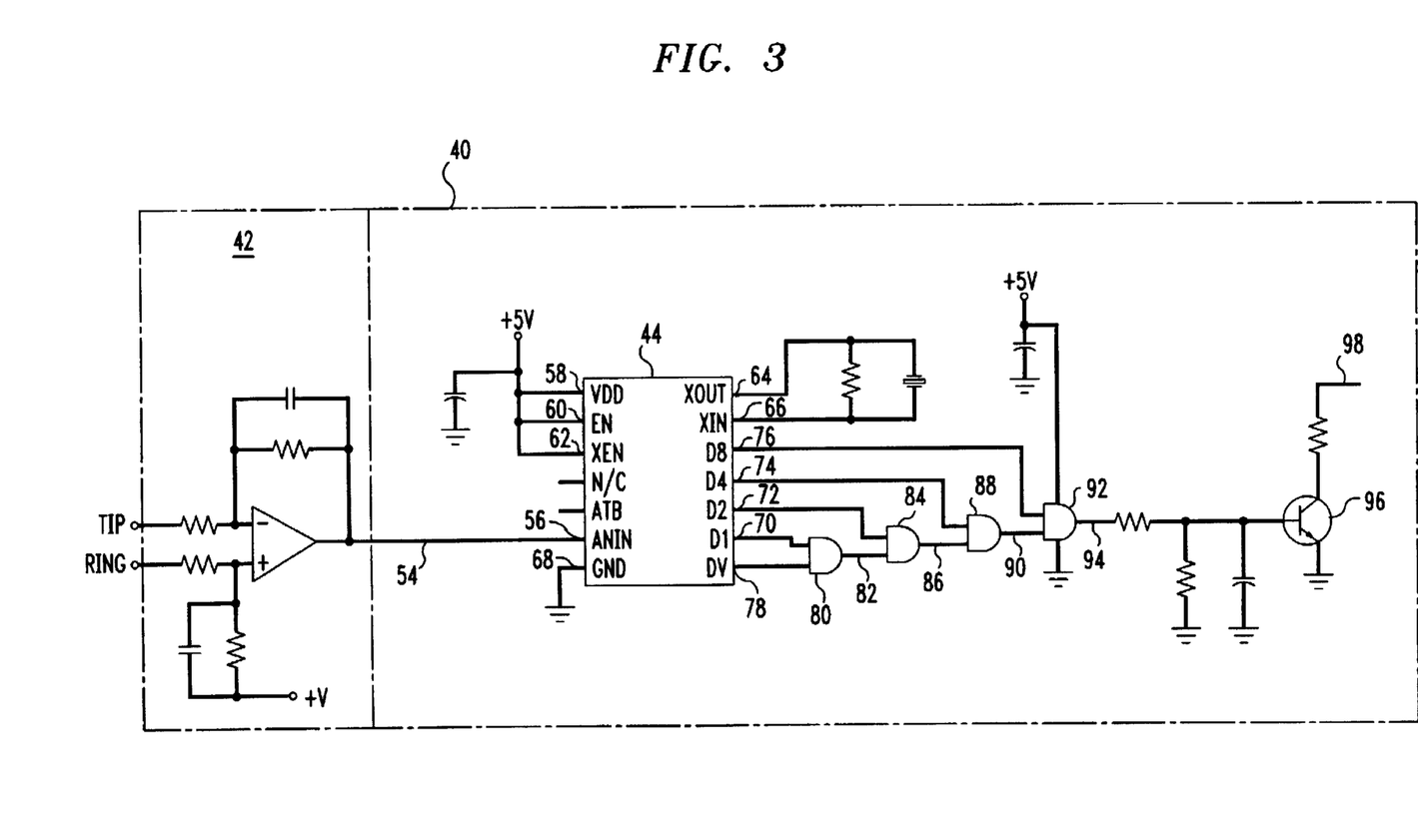
FIG. 3 is a schematic diagram of a status signal decoding circuit constructed in accordance with an illustrative embodiment of the present invention.

As best seen in FIG. 3, status signal decoding circuit 40 illustratively comprises a DC coupled differential amplifier 42 having a pair of inputs that are connected to the tip T and ring R lines of the telephone line L, respectively. Differential amplifier 42 transmits its output to a signal decoder circuit 44 which, by way of illustrative example, is a commercially available tone decoder circuit such as the CD2204 chip, which chip is configured to monitor its input for one or more of the four dual tone multi-frequency ("DTMF") tones that are not provided on a typical telephone keypad. As will be readily ascertained by those skilled in the art, the DTMF tones that are used in touch-tone telephones presently include sixteen (16) tones. The normal telephone keypad uses only twelve of these sixteen tones. Thus, there are four unused tones, labeled "A", "B", "C", and "D." More specifically, the "A" tone comprises the simultaneous 697 Hertz and 1633 Hertz, the "B" tone comprises the simultaneous 770 Hertz and 1633 Hertz, "C" tone comprises the simultaneous 852 Hertz and 1633 Hertz, and "D" tone comprises the simultaneous 941 Hertz and 1633 Hertz.

The unused tones "A"–"D" have traditionally been utilized and reserved for routing a call through telephone switches. In other words, these tones are normally used only by the various telephone switching offices that cause a connection to be established between the calling and called parties and are not used once a connection has been established. According to the present invention, one or more of these unused tones may be advantageously employed to synthesize the signal which is not available to an ordinary telephone user. It should at this point, however, be emphasized that any in-band low amplitude signals may be utilized for this purpose and that the embodiment described in detail herein is merely believed, at present, an especially expedient and economical way of carrying out the objectives of transmitting and receiving status update signals in accordance with the present invention.

As such, the present invention should not be construed as being limited to only the unused DTMF tones, but also may utilize other tones which, preferably, are not available to an ordinary telephone user. For example, a standard modem signal, a pulsing single tone, a unique single tone for a duration of time, step single tones, or any other signal which is not readily available to an ordinary telephone user can be employed. It is further contemplated that light signals may also be employed for the transmission of status uptake signals and for establishing a communication link in accordance with the present invention.

In any event, and with particular reference to FIG. 2, it will be seen that the output of tone decoder circuit 44 is, in turn, transmitted to microprocessor 36 so that tone codes can be recognized and acted upon by the microprocessor 36. Essentially, tone decoder circuit 44 is designed to decode the DTMF tones sensed on line 46 and to generate a corresponding binary signal on its output lines. The outputted binary signals are then processed by appropriate logic circuits to signal the microprocessor to, for example, open a switch 48 between power supply 50 and message waiting indication lamp 26. With this approach, the interface device 10 is able to monitor the audio and tone signals on the line without having to seize the telephone line L, thereby ensuring that the monitoring operation performed by device 10 does not diminish the sound quality of the subscriber's telephone connection.

The illustrative status signal decoding circuit 40 of FIG. 3 will now be explained in connection with the detection of the abovementioned "C" DTMF tone. While it is explained with the "C" tone, one skilled in the art can determine how to verify other tones or codes. Particularly, it is known in the art to implement various logic gates, such as AND, NAND, OR, EXCLUSIVE OR. This arrangement allows for signaling the appropriate binary high or low on the output of the gates that will correspond to the numerous output signals. Additionally, there can be an array of logic gates for a combinational series of DTMF tones and respective output codes to be detected. This arrangement creates a vast variety of ways for causing microprocessor 36 to de-energize (or energize, as the case may be, the indication lamp 26 of device 10.

FIG. 3 shows line 54 (wherein the DTMF tone is signaled) being connected to the "analog in" port 56. A five (5) volt power supply is connected to the "V DD" port 58, the "enable" port 60, and the "crystal oscillator" port 62. A crystal is connected to the "clock out" port 64 and the "clock in" port 66. "Ground" is connected to port 68. After the circuit 44 has processed the DTMF tone on line 54, a digital output is provided in a hexadecimal code corresponding to this detected tone. A table is provided below for identifying the output codes for the 16 DTMF tones (12 of the normal telephone keypad and 4 that are not available on the normal telephone keypad).

| | Output Code | | | |
|---|---|---|---|---|
| Digit | D8 | D4 | D2 | D1 |
| 1 | 0 | 0 | 0 | 1 |
| 2 | 0 | 0 | 1 | 0 |
| 3 | 0 | 0 | 1 | 0 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |
| 0 | 1 | 0 | 1 | 0 |
| * | 1 | 0 | 1 | 1 |
| # | 1 | 1 | 0 | 0 |
| A | 1 | 1 | 0 | 1 |
| B | 1 | 1 | 1 | 0 |
| C | 1 | 1 | 1 | 1 |
| D | 0 | 0 | 0 | 0 |

Port "D1" 70, port "D2" 72, port "D4" 74, and port "D8" 76 all correspond to the digital output code table above. Port "DV" 78 goes high after a valid DTMF tone pair is sensed and decoded. Therefore, if the signal (the unused DTMF tone "C"-852 Hertz and 1633 Hertz simultaneously) is detected, its corresponding hexadecimal output code 1111 is outputted on lines 70 through 78. Consequently, port "DV" 78 is high (i.e. a binary "1"), port "D1" 70 is high into AND gate 80, which respectively outputs a high signal on line 82. With port "D2" 72 being high simultaneously with line 82 at AND gate 84, line 86 goes high. Port "D4" 74 is high with line 86 so that AND gate 88 goes high on 90. Port "D8" 76 is high along with line 90 to cause AND gate 92 to go high on line 94. The five (5) volt power supply is also connected to AND gate 92 for energizing itself and transistor 96 connected on its output line 98.

With output line 94 going high, the base current from line 94 turns on transistor 96 so that collector current from the "output to local security system terminal" line 98 flows down through the transistor 96 and joins the base current therein. This combined current flows out of the emitter of the transistor 96 to ground. This sinking to ground can signal, for instance, the microprocessor 36 to output a signal to switch 48 (FIG. 2) to thereby make or break a connection between indicator lamp 26 and power supply 50.

With particular reference to FIG. 2, it will be seen that device 10 further includes a commercially available ring detecting circuit 100 that is connected to telephone line bus 102. The ring detector circuit 100 is powered from the telephone line bus 102 which is, in turn, connected to the telephone line in the particular premise involved through jack 20. The ring detector circuit comprises a conventional AC detector which detects the ringing signal from the central office. The output offing detector circuit 100 is supplied to an input of microprocessor 36.

A conventional off-hook detection circuit 104 is also powered from telephone line bus 102. The output of the off-hook detection circuit is supplied to mother input of microprocessor 36. In accordance with the present invention, microprocessor 36 is programmed to determine whether or not an incoming call has been answered at the subscriber premise, based upon the outputs of ring detector circuit 100 and off-hook detection circuit 104. If not, telecommunication device 10 is configured to point the network service provider platform 34 to see if any messages were left by the calling party. To this end, device 10 further includes a telephone line seizure relay 106, and a signaling circuit 108, illustratively a ring/tone generator, coupled to the secondary of a transformer 110 via an amplifier 120. It should be noted that if desired, microprocessor may be further provided with an internal ring counter by which the number of rings detected by ring detect circuit 100 for each incoming call may be counted and compared to a minimum number n of rings before initiating the polling operation, where n is a number equal to or greater than 1.

When microprocessor 36 detects that an incoming call to the subscriber premise has not been answered, the line seizure relay 106 controls the operation of line relay contacts 124 in order to maintain a connection on the telephone line L. The line relay contacts 124 are connected with either the tip T or ring R lines of the telephone line L. After the telephone line has been seized by relay 106, tone generator 108 is caused to generate a tone sequence that will establish a communication link between device 10 and the network application platform 34 operated by the telecommunication network services provider. That is ring/tone generator 108 generates rings and/or tones for broadcast through to the telephone line L through line amplifier 120.

In accordance with the illustrative embodiment of FIG. 2, the message waiting indicator lamp 52 comprises a low current demand LED requiring an operating current of no more than about 2 ma. Accordingly, power supply 50 may comprise nothing more than a single 9 volt battery mounted in a suitable clip type holder in the housing to power the lamp and associated circuitry. In that regard, a conservation circuit such as that disclosed in U.S. Pat. No. 5,243,642 issued to Wise et al. may be utilized to provide a low duty cycle connection between power supply 50 and lamp 52 to minimize power drain. In such a circuit, the battery source voltage is pulsed one second on and one second off and the pulses are differentiated in an RC circuit to provide only sufficient on time to the LED 52 to effect its observable illumination. This arrangement provides satisfactory life from the conventional 9 volt dry cell battery for no less than six months use under average residential telephone use conditions. It is also to be noted that battery power is utilized only after the status update signal triggers the lamp connection and that the device draws no battery current in a standby condition. A 9 volt battery adapter interface 21 is also provided (FIG. 1B). For even greater power consumption, the conservation circuit may be further configured to intermittently illuminate the lamp 52, which additionally has the effect of providing a more noticeable indication.

It should be noted that in addition to or instead of a visual message waiting indicator as indicator lamp 52, a similarly non-intrusive audible notification that may be heard from the handset of any telephone of the subscriber premise, may be provided. Illustratively, interface device 10 may be configured to be responsive to the off-hook detection circuit 104 to repetitively seize and release the line before the user uses the telephone keypad, so as to provide a discernible clicking sound. By way of further example, the signaling circuit such as ring/tone generator 108 may be configured to apply an additional audible signal such, for example, as a sequence of clearly recognizable tones, that will not be recognized by the central office, to the subscriber line.

With reference to both FIGS. 1A and 2, and as noted above, it will be recalled that device 10 may also be provided with an alphanumeric display such, for example, as liquid crystal display (LCD) 28. In accordance with additional status updates signal portions received from network service platform 34, liquid crystal display (LCD 120) may be instructed to display selected information to one or more subscribers, such as the number of stored messages for each subscriber, the time-of-day of each call, and even the telephone number of an incoming call. As will be readily ascertained by those skilled in the art, some or all of this information may be downloaded by the network into RAM 38 (FIG. 2), and made accessible by the depression of a scroll key (not shown) located on surface 24 of housing 12.

If desired, device 10 can also be configured with an amplifier 130 and audio speaker 132 to audibly reproduce previously stored announcements, such for example, a periodically reproduced message waiting announcement. Moreover, as shown in the illustrative embodiment of FIG. 2, device 10 may further be equipped with a message recording mechanism 140 that is also connected to and controlled by the microprocessor 36. In accordance with voice signals received from network service platform 34, recording mechanism 140 records incoming messages on tape, in digital memory, or by other recording expedients. The recording mechanism 140 has an input 142 for recording messages and an output 144 for playing messages back. This arrangement makes it possible, for example, to download subscriber specific messages in cases where more than one subscriber share the same telephone line and premise. Illustratively, if there are currently four messages available for subscriber A and no messages available for subscriber B, an appropriate announcement may be downloaded to recording mechanism 140 via the communication link established by ring/tone generator 108 and line seizure relay 106.

It will be noted from FIG. 2 that both IN and OUT jacks 20 and 22 are connected to the telephone line bus 102 and thus are directly connected together. Alternative to the foregoing it is possible to connect the interface device 10 to the telephone wiring in the premise via an existing connection which is usually in the form of a RJ11 jack. As a still further alternative an additional jack can be installed and connected to the premise system at a desired site. It will also be appreciated that the unit need not be at the site of a telephone and thus may be utilized to provide a remote indication of a subscriber's message waiting status. In fact, the low cost of the unit makes it feasible to utilize multiple units in multi-telephone premises to provide still further convenience.

Assuming that the interface device 10 is connected to the premise telephone system, an illustrative sequence of interaction with a network-based provider of voice and/or data message storage and delivery services will now be described in conjunction with the flow charts of FIG. 4 and 5.

Figure 4:
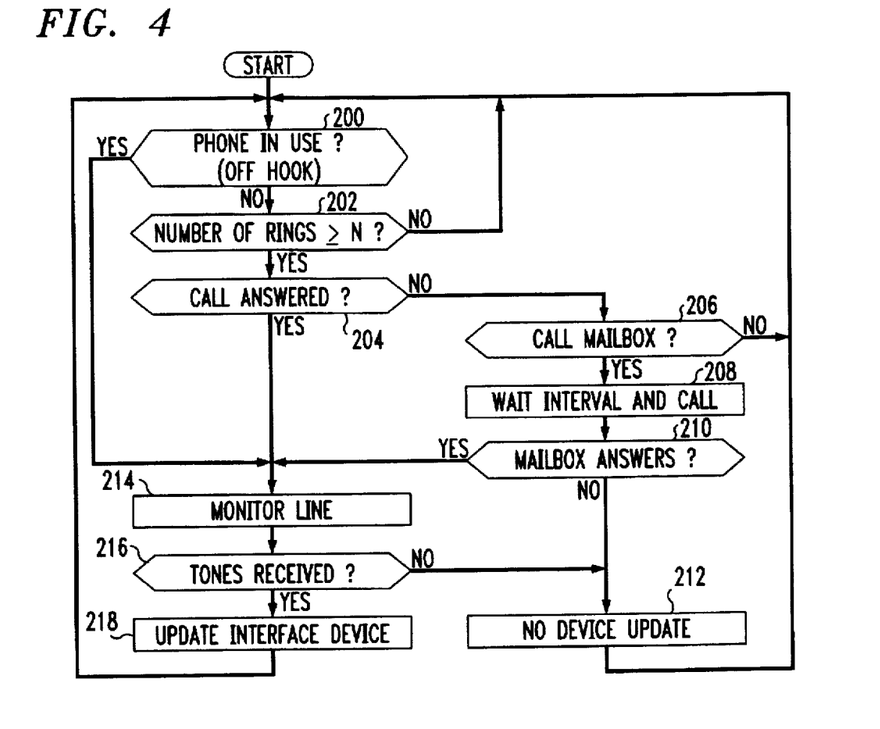
FIG. 4 is a flow diagram showing the operation and use of the device of the invention.

With reference to FIG. 4, it will be seen that the process is entered at decision block 200, wherein a determination is made as to whether any telephone device at the subscriber premise is currently in use. Optionally, the process may proceed to decision block 202, whereupon by operation of the ring detection circuit and microprocessor as described above, device 10 determines whether an incoming call has been answered after n rings, where n is a number greater than or equal to one. It should be noted that the ring counting operation of block 202 is not necessary to the operation of the invention and is shown only for purposes of illustration. In fact, in certain circumstances, as in the case where the subscriber uses the CLASS call-forwarding service, the number may only ring once at the subscriber premise location. As such, ring counting step 202, and the associated counting circuitry of device 10 is preferably omitted altogether so that immediately upon the detection of a ring by the ring detector circuit, the process proceeds to decision block 204, whereupon if an off-hook condition is not detected, a determination is made that the telephone has not been answered by the subscriber. In that event, the process proceeds to decision block 206, whereupon the interface device illustratively evaluates, based on its current message waiting indication status, whether to call the service platform for an update. For example, if the message indicator of device 10 is simply a light that is already energized or otherwise activated, as by receipt of a previous status update signal, the receipt of a second status update signal would merely be redundant. If the message indicator has not yet been activated, then the message waiting status of the subscriber is verified by establishing a communication link with the service platform. Specifically, device 10 utilizes the line seizure relay 106 and ring/tone generator 108 to perform an outcalling operation (block 208) in order to verify whether or not a voice or data message was actually delivered to the subscriber's mailbox. If no message has yet been received into the subscriber's mailbox, no update need be transmitted (block 212) and the process is re-initialized by returning to block 200. Accordingly, the message waiting lamp 26 remains de-energized.

If any subscriber premise telephone equipment as telephone 23 are in use when the process is entered (block 200), if the call is answered after n rings have been detected (block 204), or if the mailbox responds (block 210) to the polling operation of block 206, operation of the device 10 proceeds to a line monitoring operation (block 214) performed by the status update signal decoder circuit 40. In response to the polling operation of block 206, for example, a message status update signal developed in the manner described above will be transmitted (block 218) to device 10 if any messages were received for the subscriber. In this regard, it will be noted that the network services platform must know the identity of the subscriber in order to access the appropriate mailbox. Although it is possible to configure the device 10 to transmit a unique tone sequence or other identifying signal to the network service platform, it is contemplated that the ANI signal routinely provided by the central office facility may be utilized for this purpose.

In any event, and as discussed in detail above, the message update signal transmitted from the network service provider platform is recognized by decoder circuit 40, thereby causing microprocessor 36 to energize lamp 26 and, if applicable, to update an associated LCD display. Preferably, the aforementioned outcalling or polling operation is delayed by an interval sufficient to allow the calling party to record a message and/or abort the message recording process.

If the phone was in use at block 200, it is possible that the subscriber is already placing a call to the network services platform (e.g. to check his or her mailbox for messages). Accordingly, status update decoder circuit 40 monitors the line for the presence of a status update signal (decision block 216). Illustratively, if the message waiting light 26 was previously illuminated, it is appropriate for the light to be de-energized if the subscriber is now in the process of obtaining his or her messages. In that event, the status update signal may be transmitted immediately to device 10 after the subscriber establishes a communication link with the services platform. Of course, if the subscriber is not in the process of accessing the service provider's platform, no status update signal will be received (block 212) during the call and the process will be re-initialized by returning to block 200 when the call terminates. Accordingly, the state of message waiting lamp 26 remains unchanged.

Similarly, if the subscriber answers the telephone at block 204, it is possible that the incoming call is being placed by the service platform in an effort to update interface device 10, for example, to provide a message waiting indication. In that event, a status update signal may, or may not, be desirable. For example, in addition to or instead of transmitting a status update signal that will cause the device 10 to provide an alert to the subscriber, the network service platform may be configured, in a conventional manner, to audibly reproduce a message waiting announcement over the communication link. Upon hearing this announcement, the subscriber will be prompted to access his or her mailbox.

Figure 5:
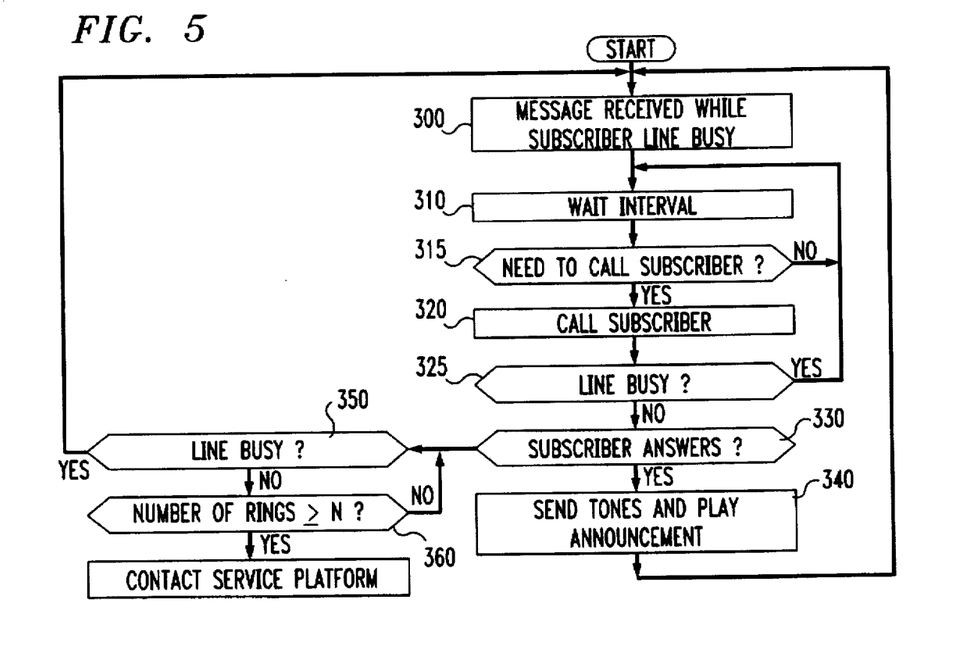
FIG. 5 is a flow diagram exemplifying interaction of an illustrative telecommunication provider's application platform with a telephone adjunct unit constructed in accordance with the present invention.

With reference now to FIG. 5, there is shown a sequence of operating a telecommunications network to provide a message storage and delivery to a subscriber where the subscriber's line was busy or call-forwarded at the time an incoming message is received. In this case, interface 10 has not had the opportunity to detect an unanswered telephone call. The process begins when a message is stored in a conventional manner at the service platform database while the subscriber line is busy (block 300). After an interval for example, one selected by the owner, of say 15 minutes (block 310), the network service platform evaluates (block 315) whether there is an earlier stored message for the subscriber for which a status update signal has already been transmitted to the subscriber's interface device. If so, it may be assumed that there is no need to update the subscriber's device and the process may be re-initialized. If not, network switch attempts to establish a communication link to device 10 (block 320). If the line is busy (block 325), the process returns to block 310. If not, the process then proceeds to decision block 330. If the subscriber answers at decision block 330, a message waiting announcement is transmitted over telephone line L (block 340). At this time, the status update signal may also be transmitted to thereby cause microprocessor 36 to illuminate message waiting lamp 26, although such a visual indication may be omitted if deemed redundant by the service provider. If device 10 is optionally configured to provide an LCD display that presents multiple subscribers with status updates, one or more tones representative of a status update associated with one of these subscribers may also be transmitted during the step represented by block 340 so that the answering subscriber may ascertain whether the message is for him or her before contacting the service platform.

If, at decision block 330, the subscriber fails to answer, the process enters decision block 350 whereupon a determination is made as to whether the line is busy. If so, the process returns to block 300 and attempts to repeat the abovedescribed sequence later. If not, the subscriber line L is allowed to ring n times (block 360), thereby prompting interface device 10 to initiate contact with the service platform and receive the status update data as, for example, in the illustrative process described in connection with FIG. 4.

From the foregoing, it will be appreciated that as an adjunct to a network-based answering service, the interface device of the present invention is capable of providing a visual alert that a call has been received and stored at the network messaging service platform. Such an alert may be provided remote from any involved telephone and may be provided at multiple locations. While the present invention has been described in reference to illustrative embodiments, other arrangements may be apparent to those of ordinary skill in the art. For example, while the disclosed embodiments utilize discrete devices, these devices can be implemented using one or more appropriately programmed processors, special-purpose integrated circuits, digital processors, or an analog or hybrid counterpart of any of these devices.

What is claimed:

1. A telephone call management device connectable to a telephone network termination node in a subscriber premise, comprising:

a housing;

a message waiting indicator light disposed on a surface of said housing;

a ring detector circuit responsive to a ringing signal at the termination node;

an on/off hook detection circuit for determining whether the subscriber has answered an incoming call;

a tone generating circuit, responsive to detection of a ringing signal by said ring detector circuit and to said on/off hook detection circuit, for establishing an interface with a network-based message storage and delivery service when an incoming call is not answered; and an alerting circuit responsive to status signals received from the network-based message storage and delivery service, for at least one of energizing and de-energizing an indicator in accordance with a message waiting status of the subscriber.

2. The telephone call management device of claim 1, further including a ring counting circuit associated with said ring detector circuit and said tone generating circuit, said tone generating circuit being operable to establish said interface upon an incoming call reaching a selected number of rings.

3. The telephone call management device of claim 2, wherein said tone generating circuit is operable to establish said interface upon the expiration of a time delay after detection of the selected number of rings.

4. The telephone call management device of claim 2, wherein the selected number of rings is at least three.

5. A telephone call management device connectable to a telephone network termination node in a subscriber premise, comprising:

a housing;

a message waiting indicator disposed on a surface of said housing;

a ring detector circuit responsive to a ringing signal at the termination node;

an on/off hook detection circuit for determining whether the subscriber has answered an incoming call;

a signaling circuit, responsive to detection of a ringing signal by said ring detector circuit and to said on/off hook detection circuit, for establishing an interface with a network-based message storage and delivery service when an incoming call is not answered;

an alerting circuit responsive to status signals received from the network-based message storage and delivery service, for at least one of energizing and de-energizing an indicator in accordance with a message waiting status of the subscriber; and a display circuit, responsive to signals received from the network-based message storage and delivery service, for displaying how many waiting messages are stored for the subscriber.

6. A telephone call management device connectable to a telephone network termination node in a subscriber premise, comprising:

a housing;

a message waiting indicator disposed on a surface of said housing;

a ring detector circuit responsive to a ringing signal at the termination node;

an on/off hook detection circuit for determining whether the subscriber has answered an incoming call;

a signaling circuit, responsive to detection of a ringing signal by said ring detector circuit and to said on/off hook detection circuit, for establishing an interface with a network-based message storage and delivery service when an incoming call is not answered; and an alerting circuit responsive to status signals received from the network-based message storage and delivery service, for at least one of energizing and de-energizing an indicator in accordance with a message waiting status of the subscriber, wherein the alerting circuit is responsive to signals received from the network-based message storage and delivery service to display a number of waiting messages for each of a plurality of subscribers.

7. A telephone call management device connectable to a telephone network termination node in a subscriber premise, comprising:

a housing;

a message waiting indicator disposed on a surface of said housing;

a ring detector circuit responsive to a ringing signal at the termination node;

an on/off hook detection circuit for determining whether the subscriber has answered an incoming call;

a dual tone multiple frequency (DTMF) generator, responsive to detection of a ringing signal by said ring detector circuit and to said on/off hook detection circuit, for establishing an interface with a network-based message storage and delivery service when an incoming call ii not answered; and an alerting circuit responsive to status signals received from the network-based message storage and delivery service, for at least one of energizing and de-energizing an indicator in accordance with a message waiting status of the subscriber.

8. The telephone call management device of claim 1, further including an audio circuit responsive to a signal receive from the network-based message storage and delivery service to audibly reproduce a message waiting status message to the subscriber.

9. The telephone call management device of claim 1, further including a low amplitude tone decoder for detecting the status signals receive from the network-based message storage and delivery service.

10. A telephone call management device connectable to a telephone network termination node in a subscriber premise, comprising:

a housing;

a message waiting indicator on said housing that visually alerts a subscriber to the storage of at least one of data and voice messages for that subscriber by a network-based message storing and delivery service;

a tone generating means for establishing an interface with the network-based message storage and delivery service that is responsive to the detection of an unanswered incoming call; and an energizer operatively associated with said message waiting indicator and responsive to signals received from the network-based message storage and delivery service, that selectively energizes and de-energizes said message waiting indicator in accordance with a message waiting status of the subscriber.

11. The telephone call management device of claim 10, wherein said tone generating means for establishing said interface with the network-based message and delivery service includes a ring detector and counting circuit for counting a number of rings associated with each incoming call and a tone generator circuit for establishing the interface after a selected number of rings have been detected.

12. The telephone call management device of claim 11, wherein said tone generating means for establishing said interface with the network-based message and delivery service further includes an on/off hook detection circuit for determining whether an incoming call is unanswered.

* * * * *